UNITED STATES PATENT OFFICE.

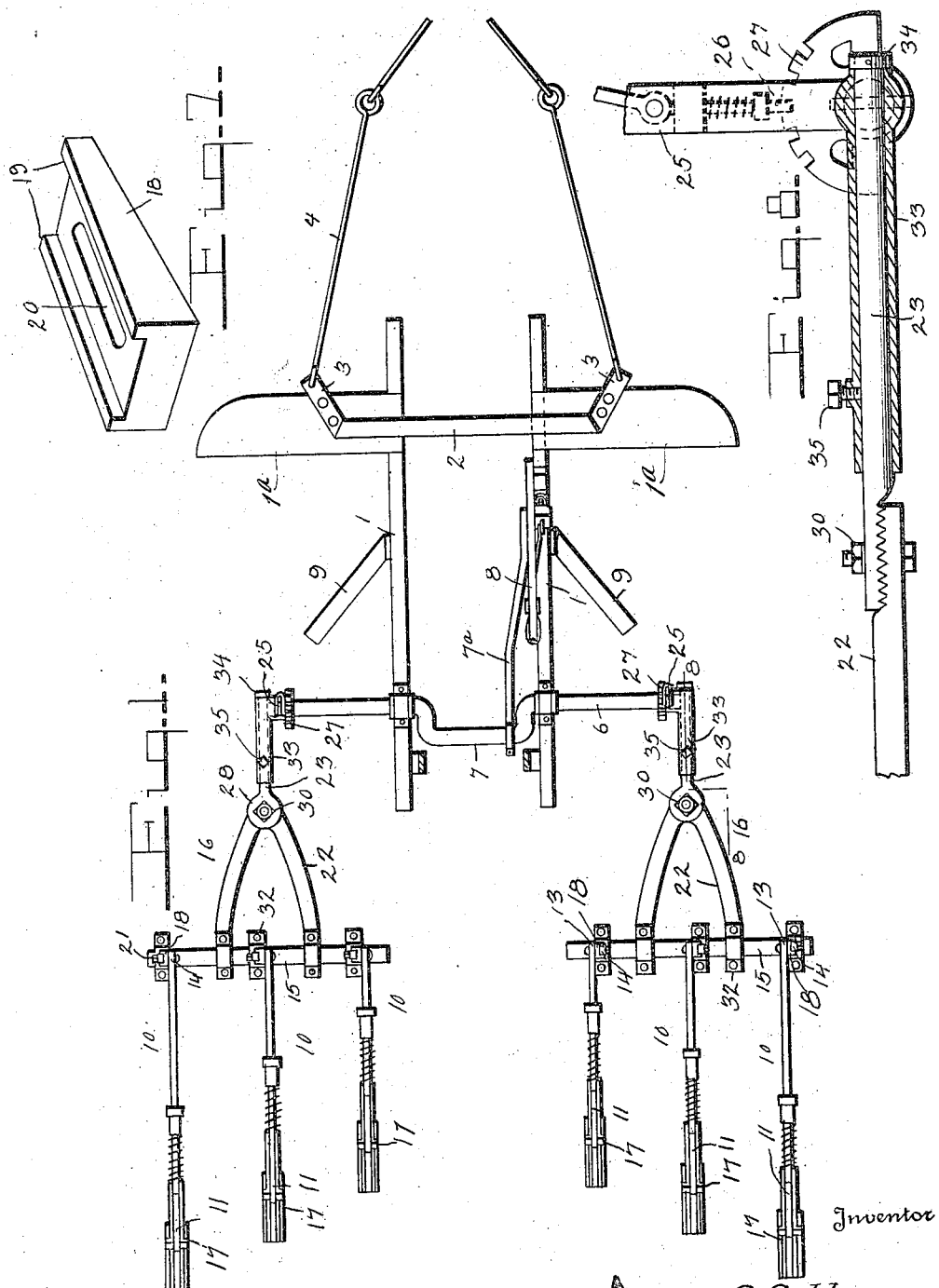

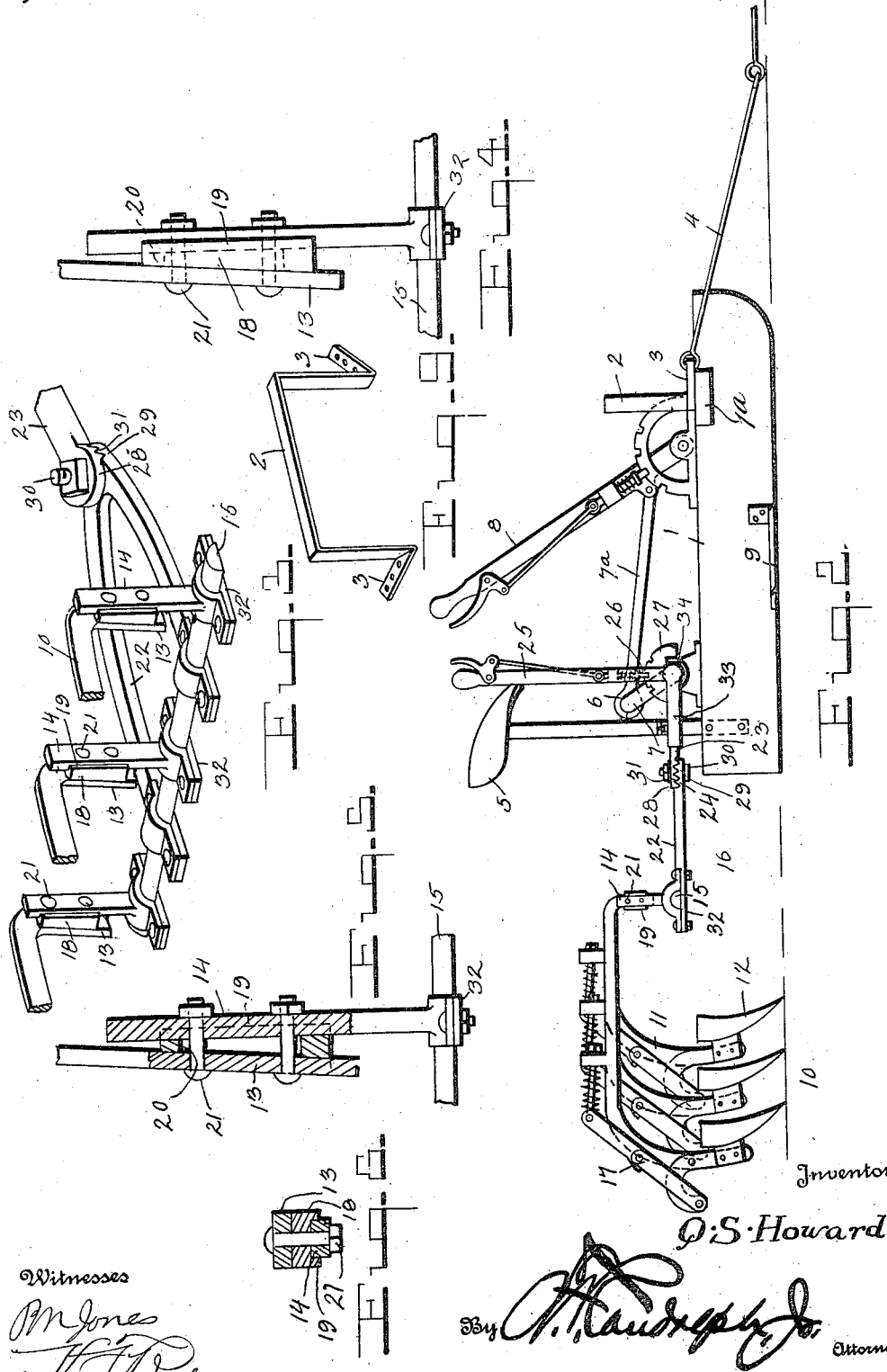

QUINTON S. HOWARD, OF LORENZO, TEXAS.

CULTIVATOR.

1,241,382. Specification of Letters Patent. Patented Sept. 25, 1917.

Application filed March 3, 1916. Serial No. 81,934.

*To all whom it may concern:*

Be it known that I, QUINTON S. HOWARD, a citizen of the United States, residing at Lorenzo, in the county of Crosby and State of Texas, have invented certain new and useful Improvements in Cultivators; and I do hereby declare the following to be a full, clear, and exact description of the invention, such as will enable others skilled in the art to which it appertains to make and use the same.

The invention relates to improvements in sled cultivators.

The object of the present invention is to improve the construction of sled cultivators and to provide a simple, practical and efficient sled cultivator of strong and durable construction equipped with a plurality of plows or shovels adapted to be adjusted to run either deeper or shallow and equipped with means for setting them at an angle so as to arrange them in proper position for operating on the ridge of listed ground.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings

Figure 1 is a plan view of a sled cultivator constructed in accordance with this invention, Fig. 2 is a side elevation of the same, Fig. 3 is a detail perspective view of one of the transverse beams or bars to which the standards of the plows are secured, Fig. 4 is an enlarged elevation of one of the upright arms which support the standards, Figs. 5 and 6 are sectional views of the same.

Fig. 7 is a detail perspective view of the wedge.

Fig. 8 is a sectional view on line 8—8 of Fig. 1.

Fig. 9 is a detail view of the arched bar.

Like numerals of reference designate corresponding parts in the several figures of the drawings.

In the accompanying drawings in which is illustrated the preferred embodiment of the invention the sled cultivator comprises in its construction a supporting frame having spaced runners 1 connected by a transversely disposed arched bar 2 or other suitable means and provided with laterally extending bars 3 located at the front portion of the runners and having the forwardly converging draft rods 4 secured to them as clearly illustrated in Fig. 1 of the drawings. The arched bar 2 is composed of vertical side portions, a top connecting portion and forwardly diverging terminal attaching portions extending from the lower ends of the side portions at approximately an angle of 45 degrees to the line of draft. The opposite side portions of the arch are set at an angle to the line of draft and this arranges the attaching portions in the said position. The attaching portions are mounted on the laterally extending arms or members 1ª of the frame and project in advance of the same to receive the draft rods. The frame which is equipped with a seat 5 for the accommodation of the driver is provided with a transversely disposed rock shaft 6 located at the rear portion of the frame and journaled in suitable bearings thereof and designed to be equipped with disks, (not shown) when it is desired to use the same for the cultivation of the soil.

The rock shaft 6 which extends laterally from opposite sides of the frame is provided at a point intermediate of its ends with a crank bend or loop 7 which is connected by a link 7ª with an adjusting lever 8 mounted on the front portion of the frame in advance of the seat and equipped with suitable latch mechanism for securing the rock shaft in its adjustment. The frame is provided at opposite sides with rearwardly diverging knives 9 which are designed to be used in connection with a plurality of plows 10 consisting of curved standards 11 each provided with a blade 12 which is relatively small but a shovel or any other soil engaging device may of course be substituted for the plow blade 12 as will be readily understood. Any number of plows 10 may be employed and the standards 11 which are provided at their front ends with vertical or substantially vertical attaching plates 13 are secured to upwardly extending arms 14 of a pair of spaced transversely disposed beams or bars 15 located in rear of the runners and the knives and carried by rearwardly projecting arms 16 of the said rock shaft. Each standard 11 which is preferably curved as shown is provided at the lower portion with a spring trip 17 which may be of any desired construction and which is shown in the drawings as being in the form of a toggle lever composed of arms held in a line by a spring. The attaching plate 13 which is secured to the upwardly extending arm 14 by upper and lower bolts is adjustably connected therewith by a wedge 18 provided at opposite sides with flanges 19 to embrace the upwardly extending arm 14 and it has a slot 20 receiving the upper bolt 21 of the wedge 18. By adjusting the wedge 18 the standard and the foot or other cultivating device carried thereby may be set at an angle or inclination to arrange it in proper position for operating on the ridge of listed soil.

The arm 16 of each set of plows is preferably composed of an approximately V-shaped rear portion 22 and a substantially straight front portion 23 connected with the rear portion by a suitable clutch 24 and adjustably mounted on the transverse rock shaft and adapted to be swung upwardly and downwardly by an operating or adjusting lever 25 connected with the front section 23 and equipped with a latch 26 for engaging a toothed segment 27 for securing the rearwardly extending arm 16 in its pivotal adjustment.

The rock shaft is adapted to be rotated to adjust the two sets of plows simultaneously and either set of plows is adapted to be adjusted independently of the other set and the clutches permit of an angular adjustment of the two sets to enable the bars or transverse beams which carry the plows to be arranged in alinement or to be disposed at an angle to each other to cultivate the soil in the desired manner. The clutch 24 is preferably composed of two disks or members 28 and 29 and a connecting bolt 30 constituting a pivot and adapted also to retain the upper and lower sections of the clutch or clamp in their relative adjustment. The plates or sections of the clamp are provided at their engaging faces with serrations 31 which interfit or interlock and coact with the bolt for firmly retaining the V-shaped rear section or portion of the arm in proper position with relation to the front portion or stem 22.

The front stem or section 23 extends entirely through the sleeve 33 carried by the rock shaft 6 and forming a bearing or support for the stem or front section 23. The stem or front section 23 is provided at its front end with a flange or collar 34 to prevent the stem or front section from slipping rearwardly in its bearing and the sleeve is equipped at its rear portion with a set screw 35 which clamps the stem or front section 23 in its rotary adjustment. By loosening the set screw the plows can be moved and arranged at any angle desired and the outside plow can be thrown clear on top of the ridge while the inside plow is still operating in the listed furrow. The wedge which is shown in an upwardly tapering position may be arranged with its larger end either at the top or bottom. The wedge is adapted to enable the plows to be arranged in a level position while the beams are at an angle and the outside plows may operate on top of the ridge and the inside plows in the furrow by such adjustment. This will prevent the plows from throwing down all the ridge at one plowing and at the same time throw plenty of soil to the plants. The knives and the two inside plows may be most advantageously used for the first plowing as the knives will clear the middle and the two plows will clean the row.

It will be seen that the cultivator is simple, practical and efficient and that the plow beams which may be of any desired number are capable of independent and simultaneous adjustment and also of adjustment to arrange the soil engaging devices in the proper position with relation to the soil when cultivating listed ground. Also the upwardly extending arms 14 are provided with clamps 32 for engaging the transverse bars or beams to permit the plow beams to be adjusted toward and from each other on the said transverse bars or beams for arranging them the desired distance apart.

What is claimed is:—

1. A cultivator of the class described including a frame having spaced runners having bearings, a transverse rock shaft journaled in the bearings and having a crank extending across the space between the runners, said rock shaft extending from opposite sides thereof, arms located at opposite sides of the frame and mounted on the rock shaft for independent vertical, pivotal adjustment, transverse bars or beams carried by the said arms, standards secured to the transverse bars or beams and provided with soil engaging devices and means for partially rotating the rock shaft to adjust the arms simultaneously and for adjusting the arms independently of each other on the rock shaft.

2. A cultivator of the class described including a frame having spaced runners having bearings, a transverse rock shaft journaled in the bearings and having a crank extending across the space between the runners, said rock shaft extending from opposite sides thereof, arms located at opposite sides of the frame and mounted on the rock shaft for vertical, pivotal adjustment, transverse bars or beams carried by the said arms, standards secured to the transverse bars or beams and provided with soil engaging devices and means for partially rotating the rock shaft to adjust the arms simultaneously and for adjusting the arms independently of each other on the rock shaft, said arms being provided with front and rear sections pivotally connected to permit a lateral pivotal adjustment of the said bars or beams.

3. A cultivator of the class described including a frame, a transverse rock shaft extending from opposite sides of the frame, arms mounted on the transverse rock shaft and located exteriorly of the frame at opposite sides thereof, each of said arms being composed of an approximately straight front section or stem and a rear approximately V-shaped section pivotally connected to such front section or stem for angular adjustment, said front section or stem and rear section being provided with means for securing them in such angular adjustment, opposite transverse bars or beams spaced apart and mounted on the rear sections of the said arms, and standards mounted on the transverse bars or beams and provided with soil-engaging devices.

4. A cultivator of the class described including a transverse bar provided with spaced upwardly extending arms, standards having cultivating devices and provided with an attaching portion secured to the said upwardly extending arms, and wedges interposed between the attaching portions of the standards and the said arms and presenting vertical faces to the arms and inclined faces to the said attaching portions, said wedges being adjustable to vary the relative positions of the cultivating devices.

5. A cultivator of the class described including a transverse bar provided with spaced upwardly extending arms, standards having pendent attaching portions arranged at the sides of the said arms, fastening devices piercing the arms and the attaching portions of the standards, and wedges interposed between the arms and the said attaching portions and presenting vertical faces to the arms and inclined faces to the attaching portions and capable of adjustment to effect a lateral tilt to the standards, said wedges being slotted to receive the fastening devices and provided with flanges for engaging the upwardly extending arms.

In testimony whereof I affix my signature in presence of two witnesses.

QUINTON S. HOWARD.

Witnesses:
J. J. KERBY,
P. M. McLOUGHLIN.

Copies of this patent may be obtained for five cents each, by addressing the "Commissioner of Patents Washington, D. C."